(12) United States Patent
Farrar

(10) Patent No.: US 6,525,169 B1
(45) Date of Patent: Feb. 25, 2003

(54) POLYCATIONIC POLYMERS, THEIR PRODUCTION AND USE

(75) Inventor: John Farrar, Rawdon Leeds (GB)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 09/720,516

(22) PCT Filed: Jun. 21, 1999

(86) PCT No.: PCT/IB99/01155

§ 371 (c)(1),
(2), (4) Date: Dec. 21, 2000

(87) PCT Pub. No.: WO99/67463

PCT Pub. Date: Dec. 29, 1999

(30) Foreign Application Priority Data

Jun. 22, 1998 (GB) .............................................. 9813246

(51) Int. Cl.⁷ ................................................ C08G 65/02
(52) U.S. Cl. ....................................................... 528/393
(58) Field of Search ......................................... 528/393

(56) References Cited

FOREIGN PATENT DOCUMENTS

| WO | WO 95/15996 | * 6/1995 |
| WO | WO 95/27008 | * 10/1995 |

* cited by examiner

Primary Examiner—Edward J. Cain
(74) Attorney, Agent, or Firm—Richard P. Silverman

(57) ABSTRACT

Polycationic polyquaternary products as defined in Claim 1 are useful as adjuvants in paper-making, especially as fixatives in the production of paper from coated broke.

14 Claims, No Drawings

POLYCATIONIC POLYMERS, THEIR PRODUCTION AND USE

BACKGROUND OF THE INVENTION

In the production of paper from aqueous papermaking furnish (stock)—depending on the various employed materials, i.e. pulps (pulps from virgin fibre, broke and/or reclaimed paper) and wet end additives, equipment and process conditions—the stock may contain a certain amount of dissolved components and suspended very fine to microscopic size components, which will normally not be retained completely in the paper web, but will be present in the white water, in which the suspended particles are visible as turbidity.

In the preparation of stock for papermaking the following operations are usually involved: 1) pulping, 2) beating and refining, 3) addition of wet end chemicals and 4) metering and blending.

In 1) [pulping] the various fibrous materials (virgin fibre, broke, reclaimed papers) are dispersed in water by means of suitable dispersing devices (pulpers, deflakers).

By 2) [beating or refining] the fibres are physically modified (by removing of primary fibre wall, bruising, swelling, hydration, etc. . . . ) in such a way as to be suitable for the desired paper production.

Operations 1) and 2) may, if desired, be combined with each other.

Before conveying the stock to the papermaking machine of the assembly, any wet end chemicals are admixed [operation 3)].

If desired, before addition of 3), different kinds of papermaking materials are metered and blended [operation 4)]. Machine broke or reclaimed paper (the latter is suitably also deinked) are preferably repulped separately and then metered and blended with another pulp.

A paper furnish stock often contains pre-refined virgin fibres blended with broke, or for recycled paper, deinked reclaimed fibres optionally blended with broke.

The various components of the white water resulting from drainage, may derive mainly from the following stages: from stages 1) and/or 2) there may result e.g. lignin sulphonates, lignin degradation products, wood extractives, cellulose derivatives (e.g. hemicellulose). From stages 3) and 4) and in particular from the use of optionally coated broke or reclaimed paper there may result components derived from fillers (e.g. white pigments, dispersants, wetting agents, etc. . . . ), from other additives (e.g. modified starches, carboxymethylcellulose, sizing agents, dispersants, dyes, fluorescent whitening agents, coating binders, wetting agents, sodium silicates, biocides, deinking soaps, etc. . . . ) and from the employed water (e.g. humic acids and water hardness salts).

The kind and proportion of such contaminants (dissolved components and fine to microscopic suspended components) in the backwater may vary broadly. Their amounts are particularly relevant in stocks from broke or reclaimed paper and where white water is recycled in the system. These backwater components represent an encumbrance of the backwater in particular with a view to its purification, and furthermore—especially where white water is recycled in the system—the presence of the above mostly anionic contaminants may lead to production problems, e.g. to sheet breaks or loss of sheet quality (e.g. holes and non-uniformity), and may impair the activity of cationic additives (such as flocculants, drainage assistants, retention aids, wet strength resins, synthetic sizing agents, cationic dyes, etc. . . . ) by forming inactive complexes with the anionic contaminants.

It is thus desirable to find a means for reducing the quantity of such backwater components and for enhancing the activity of any cationic wet end additives. In EP-A 0810322 there are described certain polyaminoethers, obtained by reaction of polyethyleneglycol, epichlorohydrin and certain primary diamines with alkaline crosslinking, which are indicated in the specification as being suitable as retention and drainage agents, fixatives and flocculants; the problem to which the there described invention refers relies however only in the retention and drainage efficiency in paper production and an improvement over the state of the art is mentioned only in relation to drainage and retention.

From EP-A-810322, WO-A-95/15996, U.S. Pat. Nos. 4,056,510 and 4,281,199 there are known certain polymers from reaction products of polyol/epichlorohydrin adducts with polyamines, which are essentially non-quaternary, and may be used in various phases of paper production, also as additives to the pulp.

SUMMARY OF THE INVENTION

It has now surprisingly been found that the below defined polycationic, polyquaternary polymers (P) of high cationic density are of outstanding efficiency in particular as fixatives in the production of paper.

The invention relates to the polycationic polymers (P) defined below, their production and use, and aqueous compositions thereof.

DESCRIPTION OF THE PREFERRED EMBODIMENTS

The invention thus provides a polycationic polyquaternary product (P) obtainable by reaction of (A) an oligohydroxyalkane of molecular weight $\geq 92$ in which the the alkane backbone is optionally interrupted by one or more ether bridges, or a mixture of two or more thereof, or a mixture one or more thereof with a $C_{2-3}$-alkanediol, with (B) epichlorohydrin, in the ratio of at least 1 mole of epichlorohydrin for every molequivalent of oligohydroxycompound of molecular weight $\geq 92$ plus 1–4 moles of epichlorohydrin for every molequivalent of $C_{2-3}$-alkanediol, to give a chloroterminated adduct (E), and quaternizing, optionally crosslinking, reaction of (E) with (C) at least one aliphatic mono or oligoamine containing on average not more than one nitrogen-bound hydrogen per nitrogen atom.

As oligohydroxyalkanes of molecular weight $\geq 92$ there may be employed known compounds, in particular low molecular oligohydroxyalkanes with 3 to 6 hydroxy groups or polyalkyleneglycols. Preferably (A) is selected from ($A_1$) an oligohydroxyalkane of the formula $$X\text{---}(OH)_{x1} \qquad (Ia),$$

in which
X signifies the x1-valent radical of a $C_{3-6}$-alkane
and x1 signifies a number from 3 to the number of carbon atoms in X, or a mixture of oligohydroxyalkanes of formula (Ia), or a mixture one or more oligohydroxyalkanes of formula (Ia) with a $C_{2-3}$-alkanediol, and (A$_2$) a polyalkylene glycol of the average formula

wherein
Alkylene signifies C$_{2-4}$-alkylene
and x2 signifies a number from 2 to 40.

As amines (C) there may be employed known aliphatic mono- or oligoamines in which at least some of the amino nitrogens are substituted with an aliphatic substituent that does not interfere with the reaction, preferably low molecular alkyl or hydroxyalkyl. (C) is preferably selected from (C$_1$) at least one aminocompound of formula

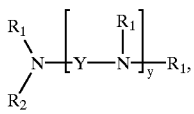

wherein
Y signifies C$_{2-3}$-alkylene,
y signifies a number from 0 to 3,
R$_1$ signifies C$_{1-3}$-alkyl or C$_{2-3}$-hydroxyalkyl
and R$_2$ signifies C$_{1-3}$-alkyl or C$_{2-3}$-hydroxyalkyl, if y is 1 to 3, or hydrogen, if y is 0, (C$_2$) a tertiary amine of formula

and (C$_3$) at least one diamine of formula

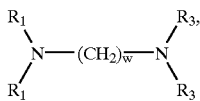

wherein
R$_3$ signifies hydrogen, C$_{1-3}$-alkyl or C$_{2-3}$-hydroxyalkyl
and w signifies a number from 2 to 6.

The process for the production of (P) is thus characterized in that (A) is reacted with (B) in the above indicated ratio of (B) to (A), to give a chloro-terminated adduct (E), and (E) is reacted with (C) to give a polyquaternary product.

The reaction components and their molar ratios are chosen so that a polyquaternary product, i.e. a product with at least two quaternary ammonium groups per molecule, is formed, preferably so that a product of polymeric character is formed, i.e. a product that contains repeating units derived from (A), in particular cross-linked products, or/and in which (A) is of polymeric character in particular a polyalkyleneglycol preferably corresponding to (A$_2$).

According to a preferred feature the invention thus provides polycationic, polyquaternary polymers (P$_1$) obtainable by reaction of (A$_1$) an oligohydroxyalkane of the formula

in which
X signifies the x1-valent radical of a C$_{3-6}$-alkane
and x1 signifies a number from 3 to the number of carbon atoms in X, or a mixture of oligohydroxyalkanes of formula (Ia), or a mixture of one or more oligohydroxyalkanes of formula (Ia) with a C$_{2-3}$-alkanediol, with (B) epichlorohydrin in the ratio of (2 to 2x1) moles of epichlorohydrin for every mole of compound of formula (Ia) plus 1–4 moles of epichlorohydrin for every molequivalent of C$_{2-3}$-alkanediol, to give a chloro-terminated adduct (E$_1$), and reaction of (E$_1$) by cross-linking, quaternizing reaction with (C$_1$) at least one aminocompound of formula

in which
Y signifies C$_{2-3}$-alkylene,
y signifies a number from 0 to 3,
R$_1$ signifies C$_{1-3}$-alkyl or C$_{2-3}$-hydroxyalkyl
and R$_2$ has a significance of R$_1$, if y is 1 to 3, or signifies hydrogen, if y is 0, and optionally chain-terminating, quaternizing reaction with (C$_2$) a tertiary amine of formula

The process for the production of (P$_1$) is thus characterized in that (A$_1$) is reacted with (B) in the ratio of (2 to 2x1) moles of (B) for every mole of compound of formula (Ia)—plus 1–4 moles of (B) for every molequivalent of C$_{2-3}$-alkanediol, to give a chloro-terminated adduct (E$_1$), and (E$_1$) is reacted with (C$_1$) and optionally (C$_2$).

As oligohydroxyalkanes of formula (Ia) there may be employed known compounds, e.g. glycerol, threitol, trimethylol-ethane or -propane and reduction products of conventional carbohydrates with five or six carbon atoms, such as sorbitol, mannitol, dulcitol and pentaerythritol.

Preferred compounds of formula (Ia) are those of formula

The compounds of formula (Ia) with four to six carbon atoms may be employed in the form of racemic mixtures or of single optical isomers; they are solid at ambient temperature and are thus expediently employed in admixture with at least one compound selected from glycerol, ethylene glycol and propylene glycol, which are liquid at ambient temperature. The quantitative ratio of such mixtures is chosen suitably so that the mixture is liquid at the chosen reaction temperature; preferably in the range of 1 to 4 parts by weight of compound of formula (Ia) with four to six carbon atoms for every part by weight of compound with two to three carbon atoms. Most preferably there is employed a mixture of a compound of formula (Ia') in which x1 is 5 or 6, with the compound of formula (Ia') in which x1 is 3 (i.e. glycerol).

The molar ratio of epichlorohydrin (B) to oligohydroxycompound or mixture (A$_1$) is preferably in the range of 3 to 1.5.x1 moles, e.g. 3 to x1 moles, of epichlorohydrin per mole of compound of formula (Ia) plus 1–4 moles, preferably 1–2 moles of epichlorohydrin per molequivalent of C$_{2-3}$-alkanediol.

According to another preferred feature the invention provides polycationic, polyquaternary products (P$_2$) obtainable by reaction of (A$_2$) an oligoalkylene glycol of the average formula

wherein
Alkylene signifies $C_{2-4}$-alkylene
and x2 signifies a number from 2 to 40.
with (B) epichlorohydrin, in the ratio of 2 or more, preferably 2 to 8, moles of epichlorohydrin for every mole of oligoalkylene glycol, to give a chloro-terminated adduct ($E_2$), and reaction of ($E_2$) with ($C_2$) a tertiary amine of formula

  (III)

or ($C_3$) at least one diamine of formula

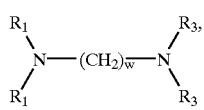  (IV)

wherein
$R_3$ signifies hydrogen or $C_{1-3}$-alkyl
and w signifies a number from 2 to 6.

The process for the production of ($P_2$) is thus characterized in that ($A_2$) is reacted with (B) in the ratio of 2 or more moles of (B) for every mole of diol of formula (Ib) to give a chloro-terminated adduct ($E_2$), and ($E_2$) is reacted with ($C_2$) or ($C_3$).

Alkylene in formula (Ib) is ethylene, propylene and/or butylene and the polyalkyleneglycols of formula (Ib) may be homo- or copolymers, preferably water soluble products (with a solubility in water of at least 10 g/l at 20° C. and pH 7). As polyalkyleneglycols of formula (Ib) there are preferably employed polyethyleneglycols or copolyalkyleneglycols containing a prevailing molar proportion of ethyleneoxy-units. More preferably there are employed polyethyleneglycols, i.e. compounds of formula (Ib) in which Alkylene signifies only ethylene.

For the reaction of ($E_2$) with ($C_2$) to give preferably diquaternary products ($P_2'$) are preferred higher molecular weight starting polyethylene glycols ($A_2$), in particular those in which x2 is in the range of 4 to 40 more preferably 5 to 36, while for the reaction of ($E_2$) with ($C_3$) to give polyquaternary products ($P_2''$) are preferred lower molecular weight starting polyethylene glycols ($A_2$), in particular those in which x2 is in the range of 2 to 24 more preferably 3 to 12.

The reaction of (A) with (B) is preferably carried out in the absence of any other solvent and in the presence of a catalyst, which is e.g. a Lewis acid preferably boron trifluoride preferably in the form of its etherate or acetic acid complex. This reaction is an addition reaction of the epichlorohydrin to a hydroxy group, with opening of the epoxy ring and formation of a 2-hydroxy-3-chloropropyl-1 radical. This reaction is exothermic and the reaction temperature is preferably kept below 100° C., more preferably in the range of 60 to 85° C., with cooling. The epichlorohydrin reacts with the available hydroxy groups of (A) and, as reaction proceeds, may also react with a hydroxy group of a 2-hydroxy-3-chloropropyl-1 radical formed during the reaction, so that some of the hydroxy groups of formula (I) may even remain non-reacted with (B). Depending on the molar ratio, on the functionality of the oligohydroxycompound (e.g. the value of x1) and on the optical configuration of formula (Ia)—especially if x1 is 4 to 6—the degree of reaction of the OH groups of (A) with (B) may vary, and may e.g. be in the range of 50 to 95% of the total number of OH groups originally present in (A). The obtained adduct (E) is a chloro-terminated product. This is then reacted with (C).

The $C_{1-3}$-alkyl radicals in $R_1$, $R_2$ and $R_3$ may be methyl, ethyl, propyl or isopropyl, the lower molecular ones being preferred, especially ethyl and methyl. The $C_{2-3}$-hydroxyalkyl radicals are preferably 2-hydroxyethyl or -propyl. Among the $C_{1-3}$-alkyl radicals and the $C_{2-3}$-hydroxyalkyl radicals the $C_{1-3}$-alkyl radicals are preferred, especially ethyl or methyl. The index y in formula (II) may be any number from 0 to 3 preferably 0 to 2, more preferably 0 or 1. Representative amines of formula (II) are dimethylamine, diethanolamine, tetramethylethylenediamine, tetramethylpropylenediamine, N,N-diethanol-N',N'-dimethylethylenediamine, pentamethyldiethylenetriamine and hexamethyltriethylenetetramine, among which the difunctional amines, in particular the lower molecular ones, are preferred, especially dimethylamine and tetramethylethylenediamine. Representative amines of formula (III) are trimethylamine, triethylamine and triethanolamine, among which trimethylamine and triethylamine are preferred. In formula (IV) the index w preferably is 2 or 3. Representative amines of formula (IV) are N,N-dimethylaminopropylamine, N,N-diethanolaminopropylamine, tetramethylethylenediamine, tetramethylpropylenediamine and N,N-diethanol-N',N'-dimethylethylenediamine.

The molar ratio of (C) to (E) is preferably chosen so that a product (P) with a density of quaternary ammonium groups as high as possible and preferably polymeric character is produced. The molar ratio of ($C_1$) to ($E_1$) is preferably chosen so that for every mole-equivalent of ($E_1$) referred to chlorine there is employed 0.5 mole of ($C_1$) ±30%, e.g. ±10%. The molar ratio of ($C_2$) to ($E_2$) is preferably chosen so that for every mole-equivalent of ($E_1$) referred to chlorine there is employed 1 mole of ($C_2$) ±30%, e.g. ±10%. The molar ratio of ($C_3$) to ($E_2$) is preferably chosen so that for every mole-equivalent of ($E_2$) referred to chlorine there is employed 0.9 mole of ($C_3$) ±40%, e.g. ±20% (if both $R_3$ are hydrogen) or 0.5 mole of ($C_3$) ±30%, e.g. ±10% (if both $R_3$ are other than hydrogen) or 0.7 mole of ($C_3$) ±35%, e.g. ±15% (if one $R_3$ is hydrogen and the other is other than hydrogen).

The reaction of (C) with (E) is carried out suitably in aqueous medium, e.g. at a water content in the range of 20 to 90%, preferably 30 to 80%, referred to the total weight of the aqueous reaction mixture, and preferably with heating, e.g. at a temperature in the range of 50 to 100° C., preferably 60 to 95° C. During the reaction, at least at the beginning, the basicity of the amine (C) is sufficient for the quaternizing alkylation of (C) with the chloride (E) used as an alkylating agent. The pH of the reaction mixture is preferably in the range of 4 to 9, at the beginning being preferably in the range of 7 to 9. As reaction proceeds, the alkalinity of the mixture and the concentration of (C) diminish. If in the reaction product there is present a proportion of covalently linked chlorine which is higher than desired, there may e.g. be added a further reactant which is a compound ($C_2$) and/or a suitable strong base, such as an alkali metal hydroxide, preferably sodium hydroxide; if the starting crosslinking reactant is a secondary monoamine [e.g. if in formula (II) y is zero], a suitable strong base, such as an alkali metal hydroxide, preferably sodium hydroxide, is expediently added for promoting quaternization, the pH being preferably maintained in the range of 7 to 9. When the reaction has completed or has reached the desired degree, the reaction mixture is suitably acidified by addition of a conventional acid, preferably a mineral acid (such as hydrochloric acid, sulphuric acid or phosphoric acid) or a low molecular aliphatic carboxylic acid e.g. with 1 to 6 carbon atoms (such as formic acid, acetic acid, citric acid or lactic acid), preferably to reach a pH below 6, more preferably in the range of 3 to 5. The proceeding of the reaction may be pursued by checking the viscosity of the reaction mixture, which gives an empirical impression of the degree of crosslinking, i.e. Quaternization. A suitable viscosity is e.g. ≦5000 cP, preferably in the range of 200 to 3000 cP.

The obtained polyquaternary polymers ($P_1$) may schematically be represented, at least for the derivatives of compounds of formula (Ia), by the following average formula:

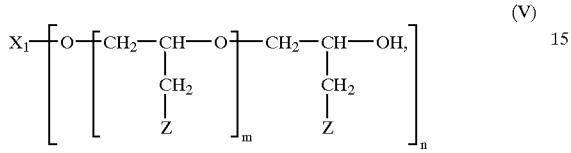

(V)

wherein $X_1$ signifies the n-valent radical of an oligohydroxyalkane ($A_1$) of formula (Ia) as defined above, n signifies a number from 2 to x1, m signifies a number from 0 to 3 and Z signifies the quaternary ammonium radical derived from ($C_1$) or respectively ($C_3$), or if y signifies 0 may also signify a corresponding tertiary amine radical, and/or two or more symbols Z of a same molecule or of two or more different molecules form together a mono-, bis-, tris or tetra-quaternary bridge derived from the cross-linking reaction of ($C_1$).

More particularly the radicals Z containing the quaternary ammonium group may be represented by the following formulae:

monovalent quaternary radicals Z of formula

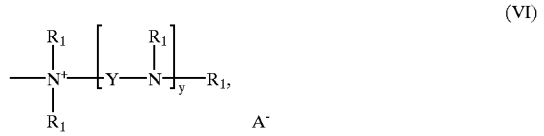

(VI)

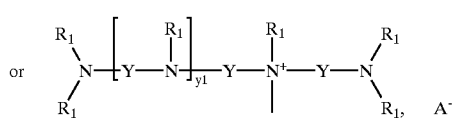

(VII)

and cross-linking bridges, formed by two or more substituents Z together, of formula

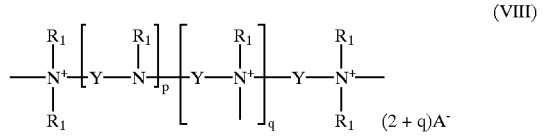

(VIII)

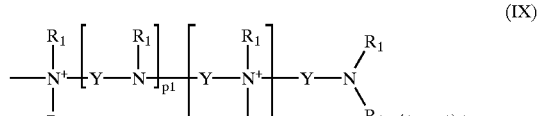

(IX)

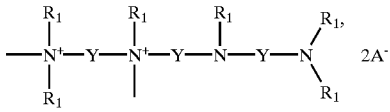

(X)

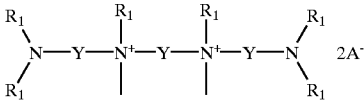

(XI)

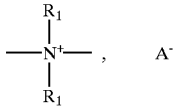

(XII)

in which $A^-$ signifies an anion, y1 signifies 0 or 1, p signifies 0 to 2, q signifies 0 to 2, p1 signifies 0 to 1, q1 signifies 1 to 2, p+q is 0 to 2 and p1+q1 is 1 to 2.

In formula (V) the index n may have a value lower than x1, especially where x1 is in the range of 4 to 6. n is e.g. in the range of 2 to 4. In formula (VIII) q is preferably 0 and in formula (IX) the index q1 preferably signifies 1.

In the above formula the counter-ion $A^-$ may be any anion formed during quaternization or by subsequent acidification, preferably chloride or formate.

Among the above products (P) the cross-linked ones are preferred.

The so produced compositions are ready for use or may, if desired, be adjusted in (P) content by dilution with water or evaporation or be desalinated and optionally concentrated by membrane filtration through a semipermeable membrane. The concentration of (P) in the aqueous composition as produced is preferably in the range of 10 to 80% by weight, more preferably 20 to 70% by weight.

The so produced polymers (P), expediently in the form of aqueous composition as produced by the method described above, serve as assistants in the production of paper, in particular as fixatives, for reducing the amount of backwater components, e.g. turbidity, in backwaters (white waters) from paper production.

The invention thus provides also a method for producing paper, in particular a paper web or sheet, from aqueous stock, wherein (P) is employed as an adjuvant, especially as a fixative. As "paper" there is intended herein also paper board and cast paper shapes. As an aqueous stock there is intended any stock, in particular cellulosic stock, as employed for papermaking and wherein the pulp suspension may derive from any origin as conventionally employed for papermaking, e.g. virgin fibre (chemical or mechanical pulp), machine broke (in particular coated broke) and reclaimed paper (especially deinked and optionally bleached reclaimed paper). The aqueous paper pulp or stock may also contain further additions as may be desired for a certain quality, such as sizing agents, dyestuffs, optical brighteners, flocculating agents, drainage and/or retention assistants. The stock concentration may vary in any conventional range as suitable for the employed pulp, machine, process and desired paper quality, e.g. in the range of 0.4 to 10%, preferably 0.8 to 6%, by weight of dry pulp. According to a particular feature of the invention there is employed a pulp from coated broke optionally blended with other pulp.

The polycationic polymers (P) are preferably employed in a concentration in the range of 0.05 to 0.5% by weight, more preferably 0.1 to 0.4% by weight referred to dry pulp. There may be employed as (P) only one kind of (P) e.g. $(P_1)$, $(P_2')$ or $(P_2'')$ alone or also a mixture of two or more thereof, e.g. a mixture of $(P_1)$ with $(P_2')$ or $(P_2'')$ e.g. in the weight ratio of 10/90 to 90/10. The pH may be in the weakly basic to distinctly acidic range, preferably in the range of pH 4 to pH 8, more preferably pH 5 to pH 7. The paper may be produced using any conventional paper making machines and in a manner conventional per se. The resulting backwater is of reduced contaminants content, in particular of reduced turbidity, and consequently the respective BOD and/or COD values are also reduced. By the use of (P) there may also be achieved an improvement of the efficiency of other cationic wet-end additives such as flocculants, retention assistants or drainage assistants, and there may be obtained paper of optimum quality while paper breakings due to disturbing anionic contaminants is correspondingly reduced. The polycationic polymers (P) of the invention are also distinguished by their compatibility with optical brighteners as conventionally employed for paper.

EXAMPLES

In the following Examples parts and percentages are by weight, if not otherwise indicated; parts by weight relate to parts by volume as grams to milliliters. The temperatures are indicated in degrees Celsius.

Example 1

109.2 parts of sorbitol are mixed with 55.2 parts of glycerol and heated to 100° C. to form a solution. One part of boron trifluoride etherate is added and the mixture is stirred and cooled to 70° C. 333 parts of epichlorohydrin are added dropwise over one hour at 70–80° C. with cooling. The reaction mixture is cooled to 20° C. and 135 parts of an aqueous 60% dimethylamine solution are added and the reaction mixture is heated slowly to 90° C. and held for one hour. The reaction mixture is than cooled to 50° C. and 150 parts of 30% sodium hydroxide and 100 parts of water are added. The mixture is held at 50–60° C. and the mixture slowly thickens as it polymerises. During this time extra water is added (275 parts) as the viscosity increases. Finally when the reaction mixture reaches the viscosity of 1000 cP the reaction is stopped by the addition of 20 parts of formic acid to give a pH of 4.

Example 2

The procedure described in Example 1 is repeated, with the difference that 81.6 parts of pentaerythritol are used in place of 109.2 parts of sorbitol.

Example 3

The procedure described in Example 1 is repeated, with the difference that 37.2 parts of ethylene glycol are employed instead of 55.2 parts of glycerol.

Example 4

The procedure described in Example 1 is repeated, with the difference that 208.8 parts of tetramethylethylenediamine are employed instead of 135 parts of dimethylamine.

Example 5

The procedure described in Example 1 is repeated, with the difference that 110.4 parts of glycerol are employed instead of the mixture of 109.2 parts of sorbitol and 55.2 parts of glycerol.

Example 6

500 parts of polyethylene glycol 200 are heated to 70° C. and 2 parts of boron trifluoride etherate are added. 693.75 parts of epichlorohydrin are added dropwise over two hours at 80–85° C. with stirring. The reaction mixture is cooled to 50° C. and 267.4 parts of N,N-dimethylaminopropylamine are added and the pH is adjusted at 8.5–9 by addition of a 30% sodium hydroxide solution. The reaction mixture is kept at 50° C. and pH 8.5 and diluted slowly wit 3000 parts of water as the reaction mixture thickens. When the viscosity reaches 1000 cP at 50° C. formic acid is added to the mixture until the pH is 4.

Example 7

The procedure described in Example 6 is repeated, with the difference that instead of polyethylene 200 there is employed the equivalent amount of polyethylene 400.

Example 8

The procedure described in Example 6 is repeated, with the difference that instead of dimethylaminopropylamine there is employed the equivalent amount of tetramethylethylenediamine.

Application Example A 100 ml of pulp are measured into a beaker and stirred at 500 rpm. The pulp is filtered through a Whatman No. 541 paper and the filtrates are retained. The COD of the filtrates is measured using standard procedures as set out by the spectrophotometer being used (Hach or Dr. Lange). Similarly the turbidity is measured using a spectrophotometer. The above procedure is repeated but this time the pulp is dosed with the cationic polymer of Example 1 at levels equivalent to 1, 2, 3 and 4 kg/t before filtration. The COD and turbidity of the filtrates are measured and compared with the blank test. There are obtained improved values.

Application Examples B, C, D, E, F and G

Application Example A is repeated, with the difference that instead of the cationic polymer of Example 1, there is employed the same amount amounts of those of Examples 2, 3, 4, 5, 6 and 7 respectively. There are obtained in each case improved values in comparison with the blank test.

What is claimed is:

1. A polycationic polyquaternary product (P) comprising reacting
    (A) an oligohydroxyalkane of molecular weight $\geq 92$, in which the the alkane backbone is optionally interrupted by one or more ether bridges, or a mixture of two or more thereof, or a mixture one or more thereof with a $C_{2-3}$-alkanediol,
    with (B) epichlorohydrin,
    in the ratio of at least 2 moles of epichlorohydrin for every mole of oligohydroxycompound of molecular weight $\geq 92$ plus 1–4 moles of epichlorohydrin for every molequivalent of $C_{2-3}$-alkanediol, to give a chloro-terminated adduct (E), and quaternizing, optionally cross-linking, reaction of (E) with
    (C) at least one aliphatic mono or oligoamine containing on average not more than one nitrogen-bound hydrogen per nitrogen atom.

2. A polycationic polyquaternary product (P) according to claim 1 in which (A) is selected from ($A_1$) an oligohydroxyalkane of the formula

X—(OH)$_{x1}$ (Ia), in which
X signifies the x1-valent radical of a $C_{3-6}$-alkane
and x1 signifies a number from 3 to the number of carbon atoms in X, or a mixture of oligohydroxyalkanes of formula (Ia), or a mixture one or more oligohydroxyalkanes of formula (Ia) with a $C_{2-3}$-alkanediol, and ($A_2$) a polyalkylene glycol of the average formula

HO-(Alkylene-O)$_{x2}$—H (Ib), wherein
Alkylene signifies $C_{2-4}$-alkylene
and x2 signifies a number from 2 to 40.

3. A polycationic polyquaternary product (P) according to claim 1 in which (C) is selected from ($C_1$) at least one aminocompound of formula

(II)

wherein
Y signifies $C_{2-3}$-alkylene,
y signifies a number from 0 to 3,
$R_1$ signifies $C_{1-3}$-alkyl or $C_{2-3}$-hydroxyalkyl
and $R_2$ signifies $C_{1-3}$-alkyl or $C_{2-3}$-hydroxyalkyl, if y is 1 to 3, or hydrogen, if y is 0, ($C_2$) a tertiary amine of formula

N($R_1$)$_3$ (III)

and ($C_3$) at least one diamine of formula

(IV)

wherein
$R_3$ signifies hydrogen, $C_{1-3}$-alkyl or $C_{2-3}$-hydroxyalkyl
and w signifies a number from 2 to 6.

4. A polycationic polyquaternary product (P) according to claim 1, which is a polycationic polymer ($P_1$) comprising reacting ($A_1$) an oligohydroxyalane of the formula

X—(OH)$_{x1}$ (Ia), in which
X signifies the x1-valent radical of a $C_{3-6}$-alkane
and x1 signifies a number from 3 to the number of carbon atoms in X, or a mixture of oligohydroxyalkanes of formula (Ia), or a mixture one or more oligohydroxyalkanes of formula (Ia) with a $C_{2-3}$-alkanediol, with (B) epichlorohydrin, in the ratio of (2 to 2.x1) moles of epichlorohydrin for every mole of oligohydroxy-$C_{3-6}$-alkane of formula (Ia) plus 1–4 moles of epichlorohydrin for every molequivalent of $C_{2-3}$-alkanediol, to give a chloro-terminated adduct ($E_1$), and reacting ($E_1$) by cross-linking, quaternizing reaction with ($C_1$) at least one aminocompound of formula

(II)

in which
Y signifies $C_{2-3}$-alkylene,
y signifies a number from 0 to 3,
$R_1$ signifies $C_{1-3}$-alkyl or $C_{2-3}$-hydroxyalkyl
and $R_2$ signifies $C_{1-3}$-alkyl or $C_{2-3}$-hydroxyalkyl, if y is 1 to 3, or hydrogen, if y is 0, and optionally chain-terminating, quaternizing reaction with ($C_2$) a tertiary amine of formula

N($R_1$)$_3$ (III).

5. A polycationic polyquaternary product (P) according to claim 1, which is a polycationic polymer ($P_2$) comprising reacting ($A_2$) an polyalkylene glycol of the average formula

HO-(Alkylene-O)$_{x2}$—H (Ib), wherein
Alkylene signifies $C_{2-4}$-alkylene
and x2 signifies a number from 2 to 40, with (B) epichlorohydrin, in the ratio of 2 or more moles of epichlorohydrin for every mole of polyalkylene glycol, to give a chloro-terminated adduct ($E_2$), and reacting ($E_2$) with ($C_2$) a tertiary amine of formula

N($R_1$)$_3$ (III)

or ($C_3$) at least one diamine of formula

(IV)

wherein
$R_3$ signifies hydrogen or $C_{1-3}$-alkyl
and w signifies a number from 2 to 6.

6. A polyquaternary polymer ($P_1$) according to claim 4, wherein ($A_1$) is a mixture of glycerol and a compound of formula (Ia) in which x1 is 4 to 6.

7. A polyquaternary product ($P_2$) according to claim 5, wherein in ($A_2$) in formula (Ib) Alkylene is ethylene.

8. A polyquaternary product ($P_2$) according to claim 7, wherein ($A_2$) in formula (Ib) x2, is a number in the range of from 4 to 40 and quaternizing reaction is carried out with ($C_2$).

9. A polyquaternary product ($P_2$) according to claim 7, wherein in ($A_2$) in formula (Ib) x2 is a number in the range of from 2 to 24 and quaternizing reaction is carried out with ($C_3$).

10. An aqueous composition comprising the polyquaternary product (P) according to claim 1.

11. A process for making paper comprising adding the polyquaternary product (P) according to claim 1 to a pulp suspension as an adjuvant in said paper making process.

12. A process for reducing turbidity in the production of paper from coated broke in a pulp suspension comprising adding the polyquaternary product (P) of claim 1 to said pulp suspension as a fixative.

13. A process for making paper comprising adding the aqueous composition of claim 10 as an adjuvant to an aqueous pulp suspension in said paper making process.

14. A process for reducing turbidity in the production of paper from an aqueous pulp suspension from coated broke, comprising adding to said pulp suspension the aqueous composition of claim 10.

\* \* \* \* \*